F. HOLUB & C. S. LOCKE.
Machine for Bending and Forging Horseshoe-Blanks.
No. 227,008. Patented April 27, 1880.
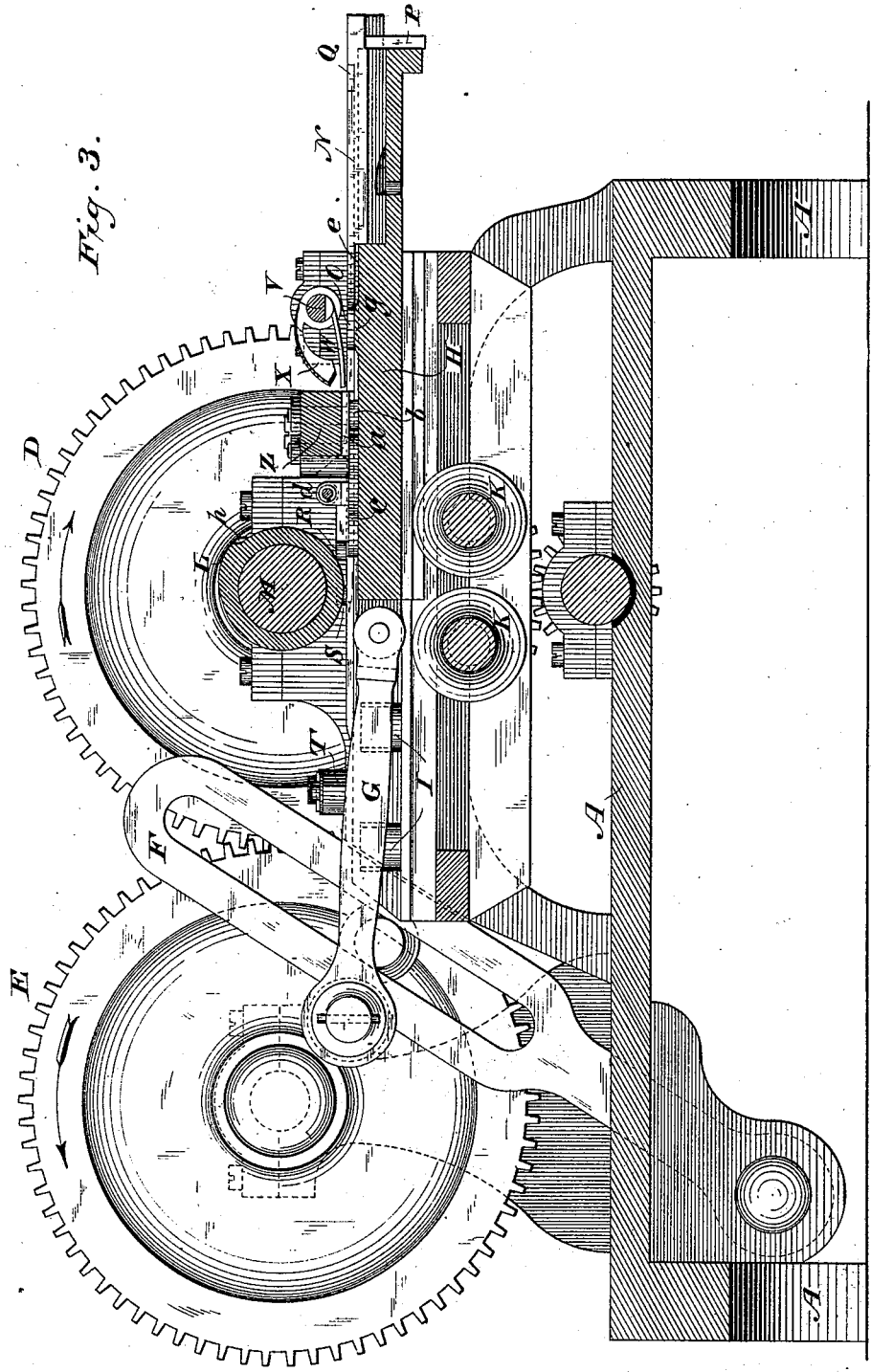
WITNESSES
Wm A. Skinkle
Wm T. Kilgrove
INVENTORS
Frank Holub,
Charles S. Locke,
By their Attorneys
Baldwin, Hopkins & Peyton 4 Sheets—Sheet 4.
F. HOLUB & C. S. LOCKE.
Machine for Bending and Forging Horseshoe-Blanks.
No. 227,008. Patented April 27, 1880.
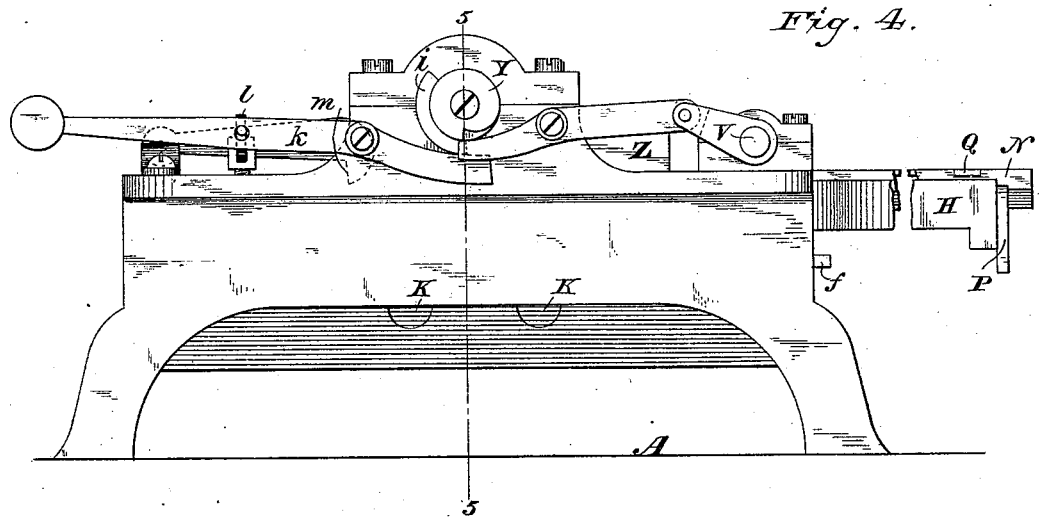
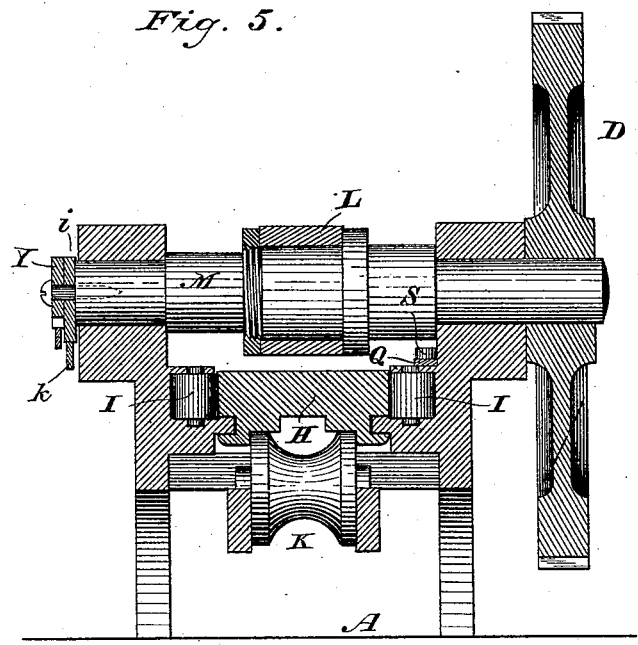
WITNESSES
Wm A. Skinkle
Wm T. Kilgrove
By their Attorneys
INVENTORS
Frank Holub,
Charles S. Locke.
Baldwin, Hopkins & Peyton.
N. PETERS, PHOTO-LITHOGRAPHER, WASHINGTON, D. C.

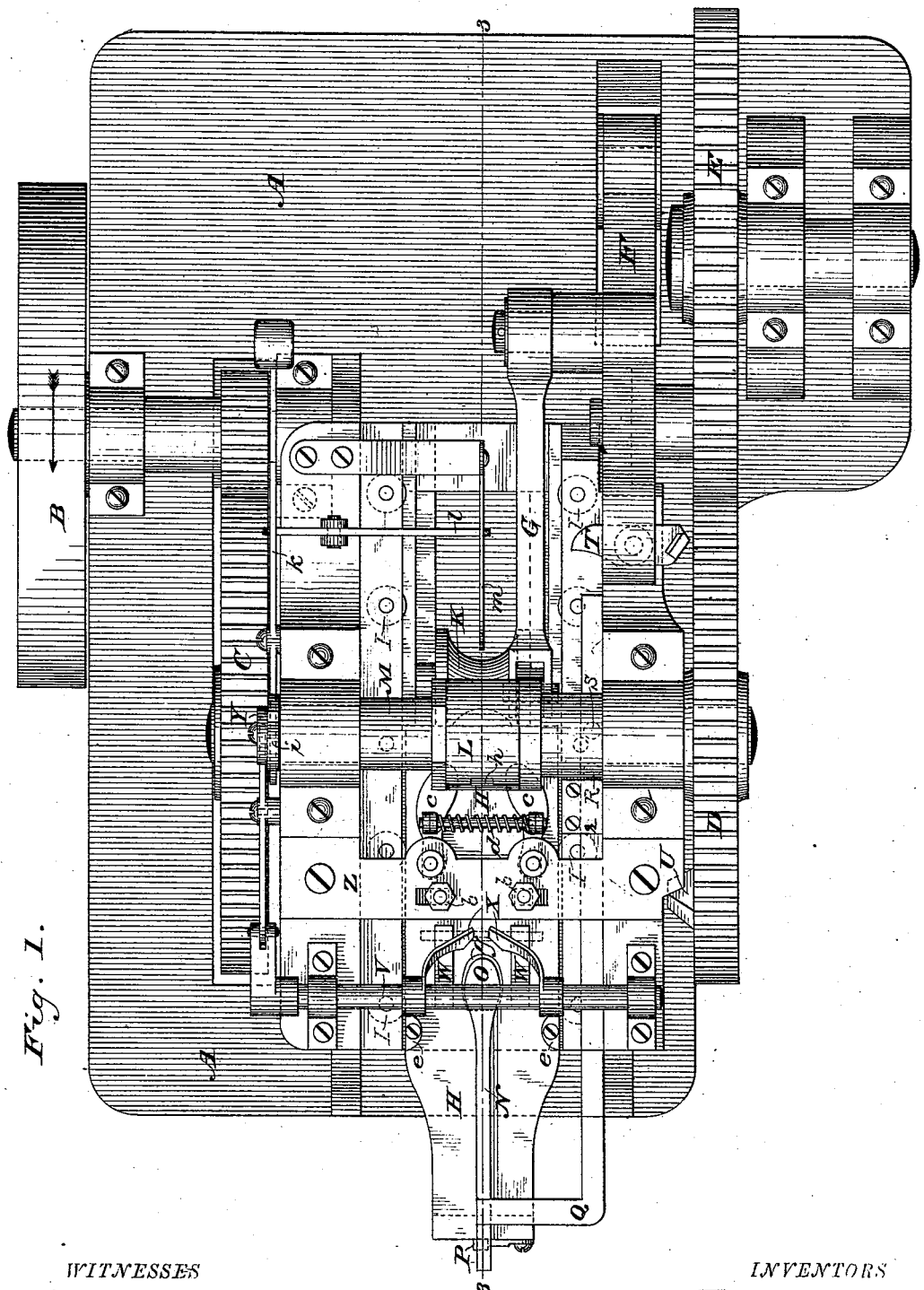

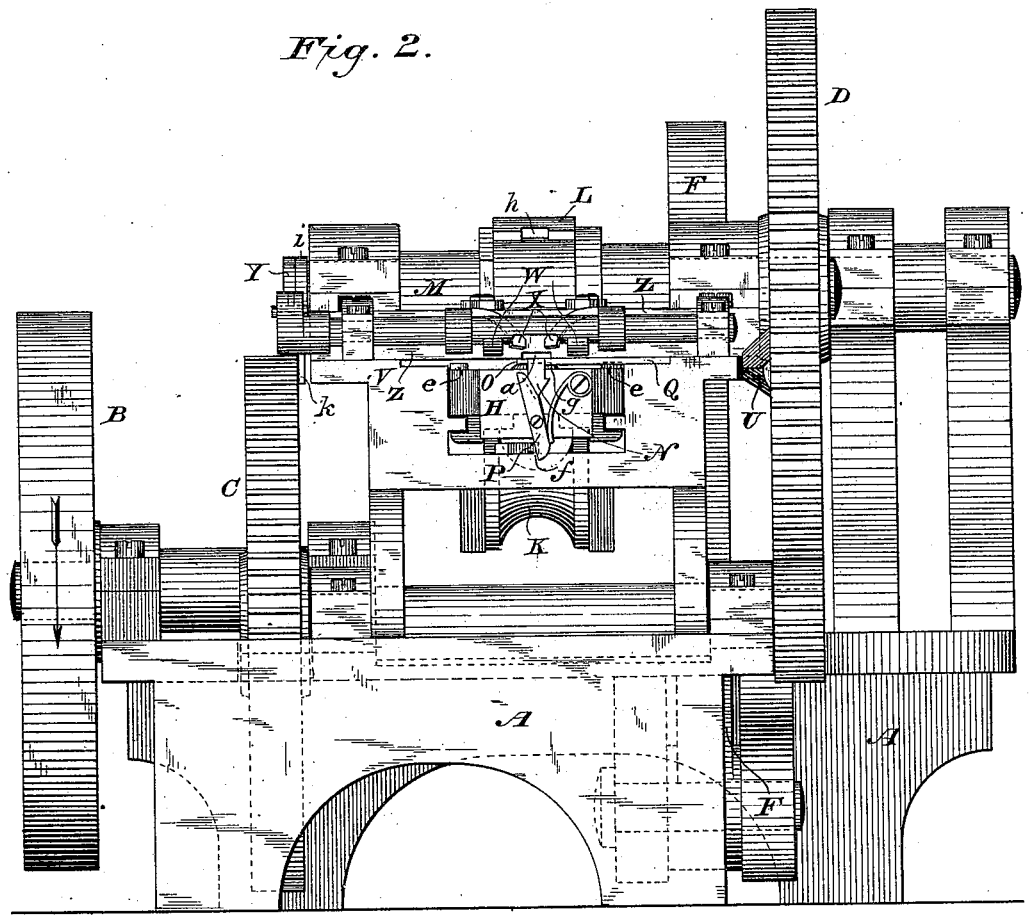

UNITED STATES PATENT OFFICE.

FRANK HOLUB AND CHARLES S. LOCKE, OF CHICAGO, ILLINOIS.

MACHINE FOR BENDING AND FORGING HORSESHOE-BLANKS.

SPECIFICATION forming part of Letters Patent No. 227,008, dated April 27, 1880.

Application filed December 8, 1879.

*To all whom it may concern:*

Be it known that we, FRANK HOLUB and CHARLES S. LOCKE, both of Chicago, in the county of Cook and State of Illinois, have invented certain new and useful Improvements in Machines for Bending and Forging Horseshoe-Blanks, of which the following is a specification.

The object we seek to accomplish by this invention is to bend a suitable horseshoe-blank and form a concave or inward incline upon its upper surface, or that part of the shoe upon which the horse's hoof rests.

Our improvements consist in certain combinations of mechanism which, after describing them in detail as to structure and mode of operation by reference to the accompanying drawings, we will succinctly specify in our claims.

In the accompanying drawings, illustrating our present invention, Figure 1 is a plan view. Fig. 2 is an elevation of the feeding end of the machine. Fig. 3 is a section on the line 3 3 of Fig. 1. Fig. 4 is a detail side elevation. Fig. 5 is a section on the line 5 5 of Fig. 4. Figs. 6 and 7 are detail views of the bending mechanism.

A indicates the main frame of the machine, upon which the bearings, shafts, gearing, and superstructure are mounted, and B the main driving-wheel, which is to revolve in the direction indicated by the arrow. This driving-wheel is geared by means of a pinion to the wheel C, which, in turn by a pinion, is geared to the wheel D which drives the gear-wheel E.

F indicates a pivoted slotted crank-shaft, in the slot of which the wrist-pin of the gear-wheel E works. To this crank-shaft, near the center, is connected a pitman, G, which is pivoted at its opposite end to the reciprocating bed-plate H. This bed-plate works upon suitable ways projecting from the supporting-frame on each side of it, in which are placed vertical friction-rollers I.

We also provide suitable strong friction-rollers K underneath the bed-plate, which support it immediately under the rotary forging-die L on the top shaft, M, at the point of greatest strain. The main driving-wheel being turned in the direction indicated by the arrow will cause the revolution of the gear-wheels and pinions mentioned and the reciprocation of the bed-plate, as will be obvious from the drawings.

On the front of the bed-plate, in a suitable slot, we place a slide-bar, N, upon the inner end of which is secured a bending-die, O. This slide-bar is arranged to move at certain different times in both directions with the bed-plate, it being forced back by the inner end of the slot in the bed-plate, and being forced forward by means of a spring-pawl, P, upon the end of the bed-plate, which bears against a small shoulder on the under side of the slide-bar. Interlocked with the slide-bar N, and always moving with it, is a slide-arm, Q, provided with a stop-pin, R, and a stud, S.

The stop-pin limits the movement of the slide-arm backward by striking a guideway, r, and the stud works in contact with a pivoted cam-lever, T, which is turned in one direction by the stud and in the other by the cam U on the wheel D, for a purpose hereinafter set forth.

A rock-shaft, V, is mounted upon the front portion of the machine, and carries two blank-supporting arms, W, and above them two guide-arms, X. This rock-shaft is given a slight movement upon its axis by means of a rotary cam, Y, on the end of the top shaft, M.

On the under side of the cross-bar Z, immediately in front of the guide-arms and of the bending-die O, is a toe-calk guide-slot, a, and on opposite sides of this guide-slot are two bending-blocks, b, firmly secured to the cross-bar. The guide-arms are curved, as shown, to guide the toe-calk on the blank into the toe-calk slot a.

Pivoted to the under side of the cross-bar are two bending-levers, c, connected by a coil-spring, d, which always tends to keep them open, and at the proper moment they are struck and partly closed by means of the cams e upon the bed-plate.

The operation of the group of parts last described is as follows: Supposing the bed-plate to have been advanced, the rock-shaft V will have been elevated with the blank-supporting arms and the toe-calk guide-arms, and in that position the horseshoe-blank is to be placed upon the blank-supporting arms with the toe-calk up, as nearly opposite the toe-calk guide-slot *a* as convenient. The machine being in motion, the bed-plate will be carried to the front and the arms will be lowered, so as to bring the blank immediately in front of the bending-die O. As the operation continues the die will move forward, carrying with it the blank, the toe-calk accurately entering the guide-slot *a*, directed by the toe-calk guide-arms. The blank will then strike the bending-blocks and be bent into U shape around the bending-die. As it continues its forward movement until it passes the bending-blocks, its heel ends will be clamped by the pivoted bending-levers, and at the proper time said levers will be operated by the cams *e* on the bed-plate, which completes the bending, the blank being held during this operation between the bed-plate and the forging-die. A little before this the cam *f* has struck the spring-pawl P and disengaged it from the shoulder on the under side of the slide-bar N, and the stud S has brought the cam-lever T into position to be struck at its opposite end by the cam U on the wheel D, which, through the instrumentality of the slide-arm Q, withdraws the slide-bar and bending-die from the shoe. Just at this juncture, as the bending-die begins to recede, the toe-calk enters the toe-calk recess *h* in the rotary forging-die L, and as the bed-plate advances the shoe is pressed down by the forging-die upon the oval die *g* projecting from the bed-plate, which forms the concave on the upper side of the shoe and finishes the bending and swaging operation. As the shoe emerges from under the rotary die L the cam *i* operates the weighted lever *k* and the lever *l* and causes the hook *m* to descend and catch over the toe-calk. The bed-plate has now reached the limit of its forward movement and begins to recede, the shoe being held in position until the bed-plate is out of the way, when it falls into any suitable receptacle.

The forging-die L is secured to an adjustable sleeve or ring upon the shaft M, and in order that it may be adjusted exactly to place at any time or removed for repairs it is secured in place by a screw-nut.

Having thus described the construction, organization, and mode of operation of our improved machine, what we claim as new, and desire to secure by Letters Patent, is—

1. The combination of the slotted reciprocating bed-plate, the slide-bar N, carrying the bending-die O, with the slide-arm Q, and spring-pawl P, cam *f* on the frame, cam-lever T, and cam U, whereby, during the operation of the machine, the bending-die may be advanced and retracted, substantially as and for the purpose described.

2. The combination of the bed-plate, the bending-die O, and the rock-shaft carrying the blank-supporting and toe-calk guide-arms, substantially as described.

3. The combination of the bed-plate, the bending-die O, the rock-shaft carrying the blank-supporting and toe-calk guide-arms, and the toe-calk guide-slot *a*, substantially as described.

4. The combination of the bed-plate, the pivoted spring-connected bending-arms, the cams *e*, and the forging-die, whereby the shoe is held and the heel ends bent, substantially as described.

5. The combination of the bed-plate, the rotary cam, the weighted lever *k*, the lever *l*, and the hook *m*, whereby the shoe is delivered out of the machine, substantially as described.

In testimony whereof we have hereunto subscribed our names.

FRANK HOLUB.
CHARLES S. LOCKE.

Witnesses:
JACOB KOKUSKA,
WILLIAM SNYDER.